(12) United States Patent
Hayashi

(10) Patent No.: US 6,371,180 B1
(45) Date of Patent: Apr. 16, 2002

(54) PNEUMATIC TIRE HAVING DIRECTIONAL TREAD PATTERN

(75) Inventor: Kazuo Hayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/501,569

(22) Filed: Feb. 10, 2000

(30) Foreign Application Priority Data

Feb. 10, 1999 (JP) .......................................... 11-033458

(51) Int. Cl.⁷ ....................... B60C 11/03; B60C 113/00; B60C 115/00
(52) U.S. Cl. ................................ 152/209.2; 152/209.28
(58) Field of Search ....................... 152/209.18, 209.28, 152/209.2, 454; D12/147, 141

(56) References Cited

U.S. PATENT DOCUMENTS

| | | | | |
|---|---|---|---|---|
| D154,422 S | * | 7/1949 | Ofensend | |
| 4,456,046 A | * | 6/1984 | Miller | 152/209.28 |
| 5,158,626 A | * | 10/1992 | Himuro | 152/209.28 |
| 5,188,684 A | | 2/1993 | Himuro | |
| D362,221 S | * | 9/1995 | Van Emburg | D12/147 |
| 5,630,892 A | * | 5/1997 | Williams et al. | 152/454 |
| 6,073,668 A | * | 6/2000 | Iwasaki | 152/454 |

FOREIGN PATENT DOCUMENTS

| | | | | |
|---|---|---|---|---|
| EP | 812709 | * | 12/1797 | 152/209.28 |
| EP | 588781 | * | 3/1994 | 152/209.28 |
| EP | 705721 | * | 4/1996 | 152/209.28 |
| EP | 0 778 162 A1 | | 6/1997 | |
| EP | 933235 | * | 8/1999 | 152/209.28 |
| JP | 4-317805 | * | 11/1992 | 152/209.2 |
| JP | 6-199109 | * | 7/1994 | 152/209.28 |
| JP | 7-290909 | * | 11/1995 | 152/209.28 |

OTHER PUBLICATIONS

Patent Abstracts of Japan, vol. 018, No. 292, Mar. 1, 1994.
Patent Abstracts of Japan, vol. 015, No. 411, Jul. 23, 1991.

* cited by examiner

*Primary Examiner*—Steven D. Maki
(74) *Attorney, Agent, or Firm*—Sughrue Mion, PLLC

(57) ABSTRACT

A pneumatic tire for passenger car has a direction tread pattern defined by a plurality of circumferential grooves and a plurality of directional slant grooves arranged at given intervals in the circumferential direction, wherein a circumferential center rib is formed in the central zone of the tread by a pair of circumferential center grooves, and a pair of circumferential middle ribs are formed by the pair of circumferential center grooves and a pair of circumferential side grooves, and a pair of circumferential side ribs are formed by the pair of circumferential side grooves and a pair of tread ends, and the directional slant grooves are directional slant center grooves formed in the circumferential middle rib and directional slant side grooves formed in the pair of circumferential side ribs, provided that each of the directional slant center grooves is opened to either of the circumferential center groove and the circumferential side groove and terminated in the circumferential middle rib and each of the directional slant side grooves is opened to the tread end and terminated in the circumferential side rib.

6 Claims, 2 Drawing Sheets

*Comparative*

PNEUMATIC TIRE HAVING DIRECTIONAL TREAD PATTERN

BACKGROUND OF THE INVENTION

1. Field of the Invention

This invention relates to a pneumatic tire, and more particularly to a pneumatic tire for passenger car having a directional tread pattern defined by a plurality of circumferential grooves continuously extending in a circumferential direction of the tire and a plurality of directional slant grooves arranged at given intervals in the circumferential direction.

2. Description of Related Art

In order to efficiently discharge water in a ground contact region to improve running performances in rainy weather, the conventionally typical pneumatic tire for passenger car generally adopts a design technique wherein a plurality of circumferential grooves continuously extending in a circumferential direction and a plurality of directional slant grooves arranged at given intervals in the circumferential direction are arranged in a tread portion to form a directional tread pattern and these circumferential grooves are communicated with the directional slant grooves so as to discharge water overflowed from the circumferential groove toward an outside of the ground contact region.

In the pneumatic tire having a directional tread pattern of excellent wet performances designed by this technique, however, it has been confirmed to degrade a pattern noise as mentioned below.

The pattern noise in the tire is constructed with various factors. One of these factors is a striking sound produced when the tire rotates and contacts with a road surface under loading. When the above design technique of communicating the circumferential groove with the slant groove is applied for discharging water overflowed from the circumferential groove toward the outside of the ground contact region, the tread portion is divided into many small blocks by the slant grooves, so that the movement of these small blocks becomes relatively large during the running of the tire and hence uneven wear produced by friction to the road surface increases. Such an uneven wear produces a step difference between the adjoining blocks, which increases the striking sound produced when the tire contacts with the road surface under loading to degrade the pattern noise in the tire.

SUMMARY OF THE INVENTION

It is, therefore, an object of the invention to solve the aforementioned problem of the conventional technique and to provide a pneumatic tire for passenger car having a direction tread pattern defined by a plurality of circumferential grooves continuously extending in a circumferential direction of the tire and a plurality of directional slant grooves arranged at given intervals in the circumferential direction which can control the occurrence of uneven wear to control or prevent the degradation of the pattern noise in the tire.

According to the invention, there is the provision of in a pneumatic tire having a direction tread pattern defined by a plurality of circumferential grooves continuously extending in a circumferential direction of the tire and a plurality of directional slant grooves arranged at given intervals in the circumferential direction, an improvement wherein:

(1) the circumferential grooves are a pair of circumferential center grooves arranged in a central zone of a tread and a pair of circumferential side grooves arranged in both side zones of the tread;

(2) a circumferential center rib continuously extending in the circumferential direction is formed in the central zone of the tread by the pair of circumferential center grooves;

(3) a pair of circumferential middle ribs are formed by the pair of circumferential center grooves and the pair of circumferential side grooves;

(4) a pair of circumferential side ribs are formed by the pair of circumferential side grooves and a pair of tread ends;

(5) the directional slant grooves are directional slant center grooves formed in the circumferential middle rib and directional slant side grooves formed in the pair of circumferential side ribs;

(6) each of the directional slant center grooves is opened to either of the circumferential center groove and the circumferential side groove and extended slantly with respect to an equatorial plane of the tire and terminated in the circumferential middle rib;

(7) each of the directional slant side grooves is opened to the tread end and extended toward the inside of the tread at an angle of 0~45° with respect to a line perpendicular to the equatorial plane and terminated in the circumferential side rib; and (8) a ratio of number of directional slant center grooves to number of directional slant side grooves is 2:3.

In a preferable embodiment of the invention, a thickness of the tread is gradually decreased from a center of the tread toward each side end of the tread.

The term "directional slant groove" used herein means a groove extending slantly with respect to the equatorial plane and forming so-called directional tread pattern wherein a rotating direction (forward direction) of the tire is designated so as to firstly contact a slantly extending portion of the groove near to the equatorial plane of the tire with ground and secondly contact a portion thereof opposite to the equatorial plane with ground when the tire is mounted onto a vehicle.

BRIEF DESCRIPTION OF THE DRAWINGS

The invention will be described with reference to the accompanying drawings, wherein.

DESCRIPTION OF PREFERRED EMBODIMENTS

Figure 1:
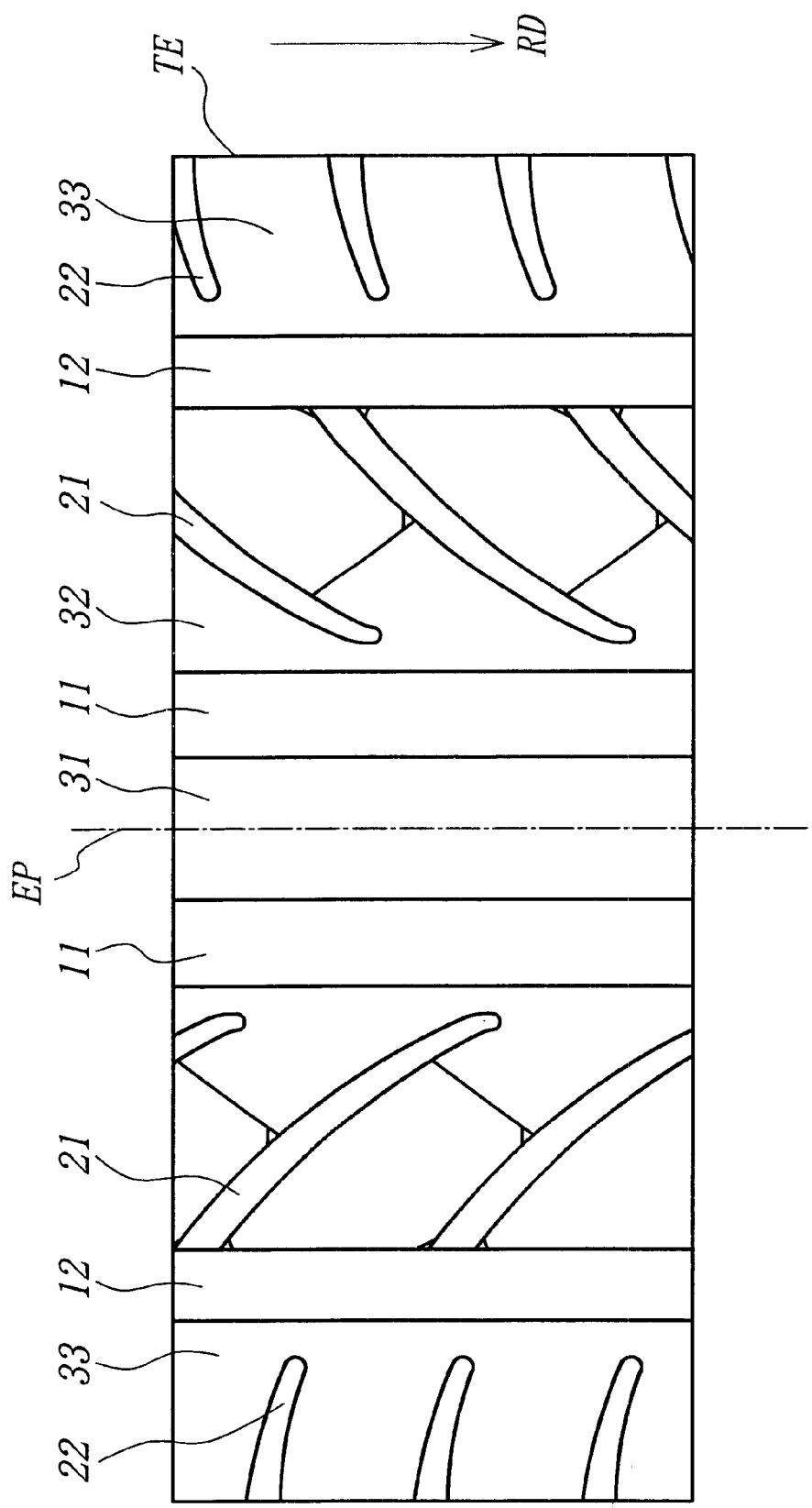
FIG. 1 is a diagrammatically developed view of a tread pattern in an embodiment of the pneumatic tire according to the invention.

In the pneumatic tire for passenger car having the above structure according to the invention, the pair of circumferential side ribs are formed by the pair of circumferential side grooves and the pair of tread ends, and each of the directional slant side grooves formed in the pair of circumferential side ribs is opened to the tread end and terminated in the circumferential side rib, so that a shoulder portion of the tread is not divided by the directional slant grooves and hence the stiffness in the shoulder portion is ensured to suppress the occurrence of uneven wear and control the pattern noise in the tire to a low level. And also, the length of the slant groove as a source causing the striking sound in the rotation of the tire is short and hence a volume of the striking sound becomes small.

Further, the pair of circumferential middle ribs are formed by the pair of circumferential center grooves and the pair of circumferential side grooves, and each of the directional slant center grooves formed in the circumferential middle rib is opened to either of the circumferential center groove and the circumferential side groove and extended slantly with respect to the equatorial plane and terminated in the circumferential middle rib, so that the circumferential middle rib is not divided by the directional slant grooves and hence the stiffness in the circumferential middle rib is ensured likewise the above case to suppress the occurrence of uneven wear and control the pattern noise in the tire to a low level. And also, the length of the slant groove as a source causing the striking sound in the rotation of the tire is short and hence a volume of the striking sound becomes small.

Moreover, the circumferential center rib continuously extending in the circumferential direction is formed in the central zone of the tread by the pair of circumferential center grooves, which contributes to improve the steering property at a slight steering angle because the rib is located in a center of the loading.

In addition, the ratio of number of directional slant center grooves to number of directional slant side grooves is 2:3, so that the shoulder portion and the circumferential middle rib in the tread have not the same peak frequency. As a result, the pattern noise in the tire is controlled to a low level. And also, the stiffness of the circumferential middle rib mainly bearing the load during the usual running is sufficiently ensured.

In general, the ground contacting profile of the shoulder portion of the tread corresponding to the ground contact end has a shape that the profile line changes toward the ground contact end within a range of 45~90° with respect to a line perpendicular to the equatorial plane of the tire. In the pneumatic tire for passenger car according to the invention, however, the directional slant side grooves are extended at the inclination angle of 0~45° with respect to a line perpendicular to the equatorial plane, whereby the striking sound during the rotation of the tire is controlled to a low level to suppress the pattern noise based on the striking sound of the slant groove (impact component) produced when the tire contacts with ground during the rotation under loading.

In the conventional tire, the thickness of the tread is uniform from the center of the tread toward both sides of the tread, so that the ground contact pressure increases toward the shoulder portion and hence the uneven wear is apt to be caused. On the contrary, in the tire according to the invention, the thickness of the tread is gradually decreased from the center of the tread toward both sides thereof, so that the ground contact pressure becomes uniform at any positions in the widthwise direction of the tire.

In FIG. 1 is shown a tread pattern in an embodiment of the pneumatic tire for passenger car according to the invention having a tire size of 225/40R18.

The tire of FIG. 1 has a directional tread pattern defined by a plurality of circumferential grooves 11, 12 continuously extending in a circumferential direction of the tire and a plurality of directional slant grooves 21, 22 arranged at given intervals in the circumferential direction.

The circumferential grooves 11, 12 are a pair of circumferential center grooves 11 formed in a central zone of the tread and a pair of circumferential side grooves 12 formed in both side zones of the tread.

A circumferential center rib 31 continuously extending in the circumferential direction is formed in the central zone of the tread by the pair of circumferential center grooves 11, and a pair of circumferential middle ribs 32 are formed by the pair of circumferential center grooves 11 and the pair of circumferential side grooves 12, and a pair of circumferential side ribs 33 are formed by the pair of circumferential side grooves 12 and a pair of tread ends TE.

The directional slant grooves 21, 22 are a plurality of directional slant center grooves 21 formed in the circumferential middle rib 32, and a plurality of directional slant side grooves 22 formed in the circumferential side rib 33. Each of the directional slant center grooves 21 is opened to the circumferential side groove 12 and extended slantly with respect to an equatorial plane EP of the tire and terminated in the circumferential middle rib 32, while each of the directional slant side grooves 22 is opened to the tread end TE and extended at an inclination angle of 0~45° with respect to a line perpendicular to the equatorial plane EP toward the inside of the tread and terminated in the circumferential side rib 33.

The ratio of number of the directional slant center grooves 21 to number of directional slant side grooves 22 is 2:3 as shown in FIG. 1.

All of the directional slant grooves 21, 22 are grooves extending slantly with respect to the equatorial plane EP, wherein an extending portion of each groove near to the equatorial plane EP is firstly contacted with ground and an extending portion thereof opposite to the equatorial plane EP is secondly contacted with ground so as to designate a rotating direction RD of the tire when the tire is mounted onto a vehicle.

Although the illustration is omitted, the thickness of the tread is gradually decreased from the center of the tread toward both sides thereof.

Figure 2:
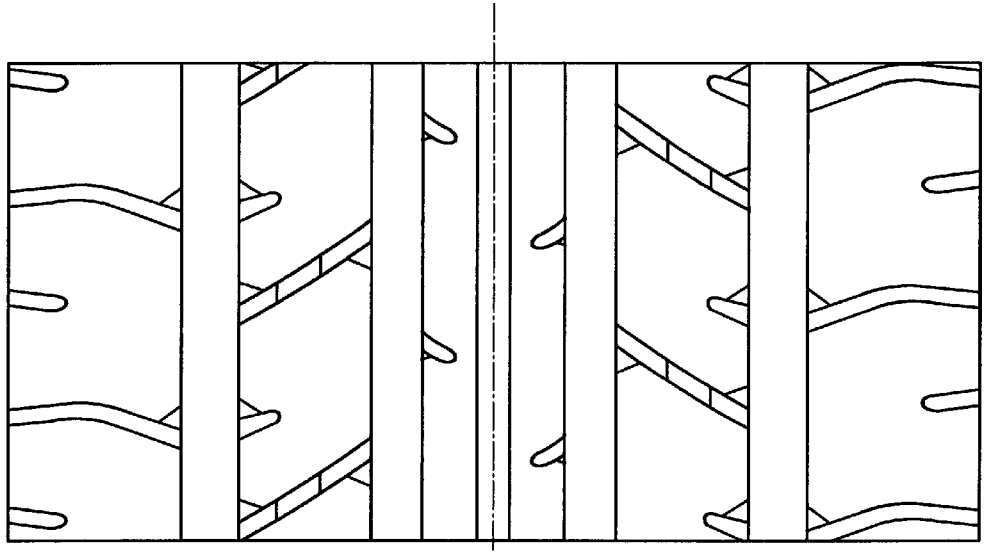
FIG. 2 is a diagrammatically developed view of a tread pattern in the conventional pneumatic tire.

The conventional pneumatic tire has a tread pattern as shown in FIG. 2. This pattern is the same as the pneumatic tire according to the invention except that the directional slant center groove 21 is opened to the circumferential center groove 11 and the circumferential side groove 12 and the directional slant side groove 22 is opened to the circumferential side groove 12 and the tread end TE.

Figure 3:
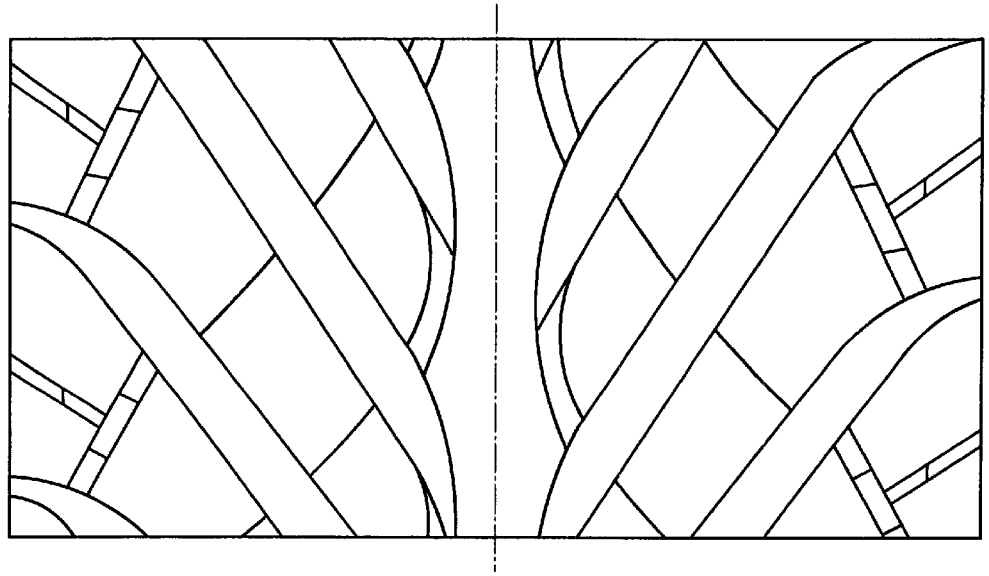
FIG. 3 is a diagrammatically developed view of a tread pattern in a comparative pneumatic tire.

In FIG. 3 is shown a tread pattern of a comparative pneumatic tire.

With respect to the pneumatic tires for passenger cars having tread patterns shown in FIGS. 1 to 3 are made tests for evaluating the resistance to uneven wear and the pattern noise.

Each of the tires is mounted onto a rim of 8J-18, inflated under an internal pressure of 2.3 kgf/cm$^2$ and mounted onto a middle size sedan made in Europe, which is actually run on a general-purpose road over a distance of 5,000 km and thereafter a stepped quantity through uneven wearing is measured for the evaluation of the resistance to uneven wear. The pattern noise is evaluated at 10 point stage by a feeling test of a professional driver during the above actual running of the tire.

The test results are shown in Table 1.

TABLE 1

|  | Conventional tire | Comparative tire | Invention tire |
| --- | --- | --- | --- |
| Stepped quantity through uneven wearing (mm) | 0.43 | 0.36 | 0.12 |
| Pattern noise (in a new product) | 6.5 | 7 | 7.5 |
| Pattern noise (after wearing) | 2 | 4− | 4 |

As seen from Table 1, the pneumatic tire for passenger car according to the invention is less in the stepped quantity through uneven wearing and excellent in the pattern noise as compared with the conventional and comparative tires.

What is claimed is:

1. A pneumatic tire having a directional tread pattern defined by a plurality of circumferential grooves continuously extending in a circumferential direction of the tire and a plurality of slant grooves arranged at given intervals in the circumferential direction, wherein:

(1) the circumferential grooves comprise a pair of circumferential center grooves arranged in a central zone of a tread and a pair of circumferential side grooves arranged in both side zones of the tread:

(2) a circumferential center rib continuously extending in the circumferential direction formed in the central zone of the tread by the pair of circumferential center grooves;

(3) a pair of circumferential middle ribs formed by the pair of circumferential center grooves and the pair of circumferential side grooves;

(4) a pair of circumferential side ribs formed by the pair of circumferential side grooves and a pair of tread ends;

(5) wherein said plurality of directional slant grooves are directional slant center grooves formed in the circumferential middle ribs and directional slant side grooves formed in the pair of circumferential side ribs;

(6) each of said directional slant center grooves is opened to either of the circumferential center groove and the circumferential side groove and extended slantly with respect to an equatorial plane of the tire and terminated in the circumferential middle rib so that the middle rib is continuous;

(7) each of the directional slant side grooves is opened to the tread end and extended toward the inside of the tread at an angle of 0–45 degrees with respect to a line perpendicular to the equatorial plane and terminated in the circumferential side rib so that the side rib is continuous;

(8) a ratio of number of directional slant center grooves to number of directional slant side grooves is 2:3, and (9) on each side zone of the tread, all of the directional slant center grooves and the directional slant side grooves are slanted in the same direction with respect to the circumferential direction.

2. A pneumatic tire according to claim 1, wherein the tread has a thickness gradually decreasing from a center of the tread toward each side end of the tread.

3. A pneumatic tire according to claim 1, wherein said pair of circumferential center grooves are both straight grooves.

4. A pneumatic tire according to claim 2, wherein said pair of circumferential side grooves are each straight grooves.

5. A pneumatic tire according to claim 1, wherein said pair of circumferential side grooves are each straight grooves.

6. A pneumatic tire according to claim 1, wherein directional slant center grooves are arranged on opposite sides of said circumferential center rib to alternatively contact the ground during tire rotation.

* * * * *